Jan. 22, 1957 K. HUEFTLE 2,778,511
WAGON BOX TO ELEVATOR POWER TRANSFER UNIT
Filed April 24, 1953 2 Sheets-Sheet 2
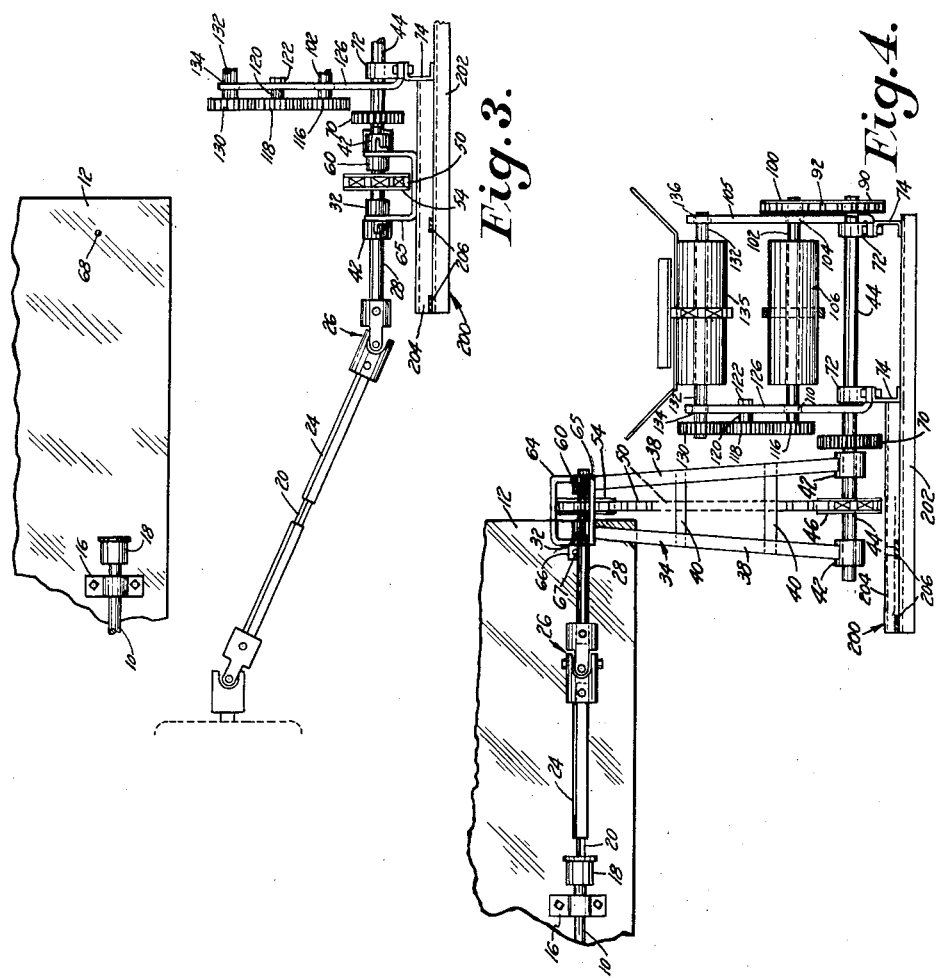
INVENTOR.
Karl Hueftle
BY
Agent

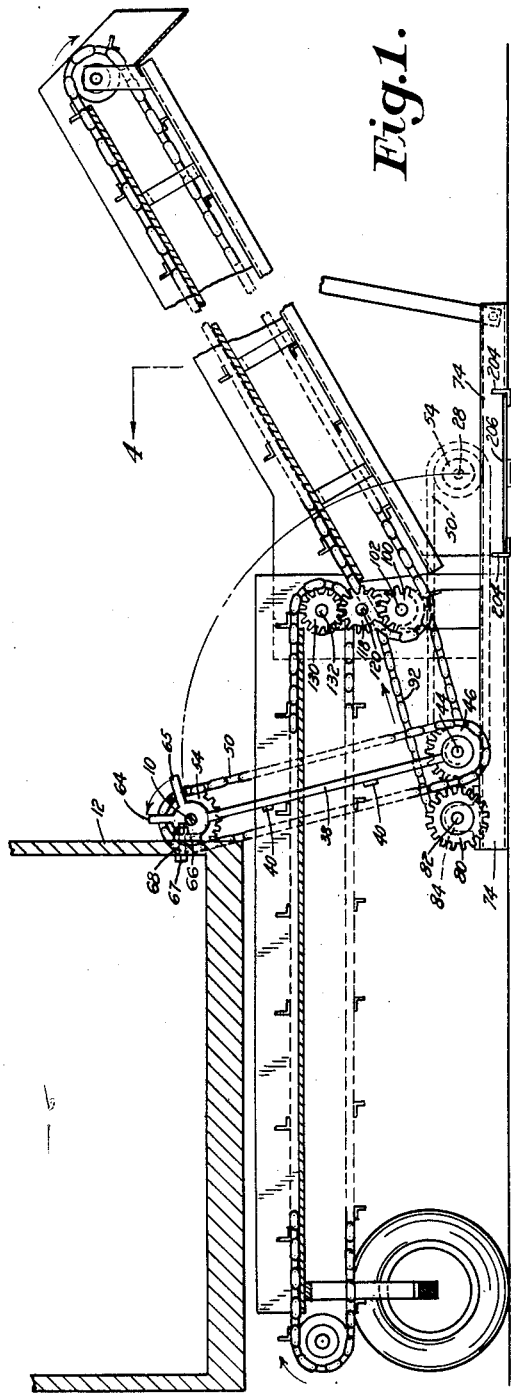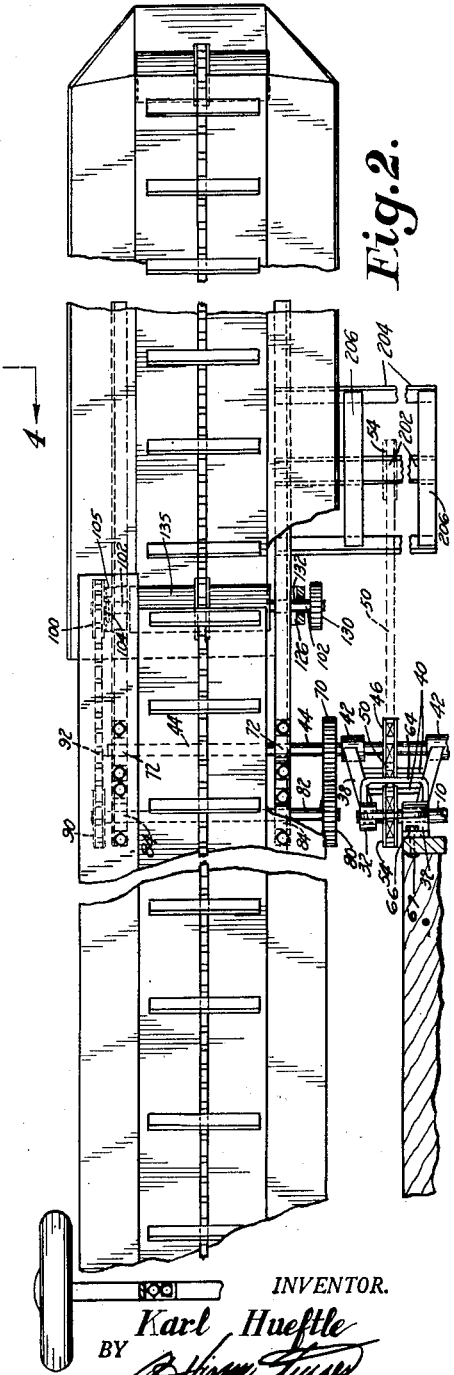
Fig.1.
Fig.2.
INVENTOR.
Karl Hueftle
BY
Agent

United States Patent Office 2,778,511
Patented Jan. 22, 1957

2,778,511

WAGON BOX TO ELEVATOR POWER TRANSFER UNIT

Karl Hueftle, Cozad, Nebr.

Application April 24, 1953, Serial No. 350,971

4 Claims. (Cl. 214—46)

This invention relates to the power elevating of grain, sileage or corn from a farm wagon upwardly to be stored and more particularly it is an object of this invention to provide a device for transferring power from a rotating shaft on a farm wagonbox to an elevator.

In the past it has been the practice to unload farm wagonboxes by power driven conveyors forming a part of the conveyor in the farm wagonbox being driven from the power take-off of a tractor. It has been the practice to place a conveyor trough unit underneath the rearward end of the farm wagonbox and to place an elevating conveyor at the end of a conveyor trough unit whereby material is emptied from the farm wagonbox rearwardly onto the conveyor track unit and then is carried to the elevator conveyor unit for delivery upward to storage.

This practice has had a disadvantage in that an extra power unit has been necessary for driving the conveyor track unit and for driving the elevator conveyor since the tractor has been occupied with driving the conveyor in the farm wagonbox.

It is the object of this invention to eliminate the need for an extra power unit to drive the trough conveyor unit and the elevator conveyor.

It is a particular object of this invention to provide a power transfer unit adapted to receive power from a shaft which is journaled alongside the farm wagonbox customarily, many power driven farm wagon units of this type being now in use with the power transfer shaft delivering power to the trough conveyor and to the elevator conveyor unit.

Yet a further object of this invention is to provide a power transfer unit as described which is also capable of being driven by a tractor if desired and from the power take-off shaft of the tractor.

Yet a further object is to provide a power unit as described which can be driven from any source of power.

A particular advantage is to provide a combination assembly of a farm wagon having a power shaft journaled on a side thereof, a trough conveyor unit and an elevator conveyor unit in further combination with a drive assembly for driving the two conveyor units from the power shaft of the wagon.

Other and further objects and advantages of the present invention will be apparent from the following detailed description, drawings and claims, the scope of the invention not being limited to the drawings themselves as the drawings are only for the purpose of illustrating a way in which the principles of this invention can be applied.

Other embodiments of the invention utilizing the same or equivalent principles may be used and structural changes may be made as desired by those skilled in the art without departing from the present invention and the purview of the appended claims.

Figure 1 is a side elevation of a trough conveyor shown disposed at one end of a farm wagonbox, an end of the farm wagonbox shown in cross section for convenience of illustration, a side portion of the trough of the trough conveyor unit being broken away and a portion of the remainder thereof being shown in section for clarity of illustration, the power transfer unit of this invention being shown in full lines in operative position and in dotted lines in a down position in which it would be used if it were driven from a tractor or other power unit, a half portion of the housing of an elevator conveyor being broken away and parts of the remainder being shown in section for clarity of illustration.

Figure 2 is a top plan view of the parts shown in Figure 1 including an end portion of the farm wagonbox.

Figure 3 is a detail end elevation of the power transfer unit of my invention in a "down" or horizontal position as shown in dotted lines in the side elevation of Figure 1 whereby it may be driven from the power take-off of a tractor indicated in dotted lines, adjacent portions of the conveyor being broken away for clarity.

Figure 4 is a view-in-section taken along the line 4—4 of Figure 1.

The power transfer assembly of this invention is for utilizing the power of a horizontally disposed power shaft 10 journaled along the side of a wagonbox, portions of which latter are shown in Figures 1, 2, 3 and 4.

The shaft 10 is journaled in bearings 16 and power is indirectly supplied to the shaft 10 from a tractor or other power supply source, not shown. The farm wagon 12 having shafts 10 are now commonly used.

The rearward end of the power transfer shaft is provided with a coupling 18 for removably securing a square shaft 20 thereto. The shaft 20 extends rearwardly and is slidably secured in a square sleeve 24 which latter extends rearwardly to and is attached to a universal joint 26. From the universal joint 26 a shaft 28 leads rearwardly and is journaled in a bearing 32 mounted upon a frame 34 of the power transfer unit of this invention. The frame 34 comprises two side members 38 which are disposed normally extending upwardly and are spaced apart farther at their lower ends than at their upper ends.

The members 38 are secured together by transverse frame members 40 and the members 38 have bearings 42 at their lower ends for receiving a shaft 44 therethrough upon which a gear 46 is rotatably mounted for being driven by a chain 50 which is disposed over another gear 54 on the shaft 28 of the rearward side of the bearing 32 and between the bearing 32 and another bearing 60 which latter is disposed on the upper end of the rearwardmost frame member 38.

A bracket member 64 extends upwardly and outwardly from the frame member 38 across the gear 54 as seen in Figure 3. A second bracket member 65 similar to the member 64 extends outwardly and to the right of the frame 34 being fixed on one side to the bearing 32 and on the other side to the bearing 60. The bracket 65 is adapted to extend vertically downwardly from the bearings 32 and 60. Another frame member 34 is in the approximately horizontal position as best seen in Figure 3.

An ear 66 is attached to the bearing 32 on the left hand side thereof as best seen in Figure 4. The ear 66 having an aperture therethrough for receiving a bolt which latter is numbered 67 and is received in a bolt hole 68 in the wagon 12.

The shaft 44 extends rearwardly through another gear 70 and then is journaled within bearings 72 which latter are secured one on each of the supporting members 74 of the elevator conveyor unit.

A gear 70 is rotatably mounted on the shaft 44 rearwardly but adjacent to the lower rearward bearing 42 of the frame member 38 and is in mesh with another gear 80.

The gear 80 is rotatably mounted upon the forward end of a shaft 82. The shaft 82 extends rearwardly and is journaled within bearings 84 which latter are secured one to each of the two supporting members 74 of the elevator conveyor unit. The shaft 82 extends rearwardly a substantial distance past the rearward most supporting member 74 of the elevator conveyor unit and has a gear 90 rotatably mounted on the end thereof and is for the purpose of driving a chain 92 which extends rearwardly and upwardly and is disposed about another gear 100.

The gear 100 is rotatably mounted upon the rearwardmost end of a shaft 102. The shaft 102 extends forwardly through a bearing 104. The bearing 104 is secured to a rearwardly disposed vertical side member 105. The shaft 102 extends further forwardly and has a chain driving roller 106 rotatably secured thereon, the latter being for the purpose of driving a chain having secured thereto flights of the elevator conveyor unit. The shaft 102 continues forwardly through a bearing 110, which latter is secured to a vertical side member 126 which is disposed on the forward side of the conveyor unit and has rotatably mounted on its outermost end another gear 116.

An idler gear 118 is provided and is disposed directly above and in mesh with the gear 116. The idler gear 118 is mounted on the outer end of a sub-shaft 120. The inner end of the sub-shaft 120 is rotatably mounted within a bearing 122 which latter is suitably secured to a vertical side member 126. Disposed directly above and in mesh with the gear 118 is another gear 130. The gear 130 is rotatably secured to the forwardmost end of a shaft 132. The shaft 132 then extends rearwardly through a bearing 134 secured to the vertical side member 126 through a roller 135 which operates the conveyor hopper and terminates journaled within a bearing 136 secured to the vertical side member 105 similar to the vertical side member 126 on the forward side of the unit.

As best seen in Figure 3 of the drawings and also in dotted line position in Figure 1, the power transfer unit is shown in its down position. This position is used when the wagonbox is not being unloaded. The power transfer unit in the down position may receive power from optional sources whereby the conveyor unit may be used separately.

The power supply may be taken from a tractor which may be disposed forward of the unit thereby eliminating the need for auxiliary power which is commonly used on such units.

As best seen in Figure 2, the power transfer unit in down position has the U-shaped member 64 resting on a platform generally indicated at 200.

The supporting platform 200 comprises an elongated foot member 202 which is transversely disposed and secured to the undersides of the conveyor supporting members 74 and has rectangularly shaped frame members 204 having transversely disposed resting members 206 secured thereto. The supporting platform frame 204 has its innermost end secured to the supporting member 74 of the elevator conveyor unit.

The supporting platform 200 thus provides a resting place for the frame of the power transfer unit when the unit is in a down position, thereby keeping the gears and chains from coming in contact with the ground.

As thus described, this invention provides a power transfer unit which may be adapted to receive power indirectly from a wagonbox arrangement now commonly used or may receive power directly by coupling the shaft 20 to a tractor or other means of power.

The power is transferred to the power transfer unit by means of the shaft 20 which is coupled to another shaft 28 by means of the universal joint 26 the shaft 28 rotatably turns the gear 54 which in turn drives a chain 50 disposed about and drives another gear 46.

The gear 46 rotates the shaft 44. The gear 70 which is secured to the shaft 44 is in mesh with another gear 80 which is disposed outwardly of the gear 70 and drives the shaft 82 which extends rearwardly and has a gear 90 mounted on its rearwardmost end.

The gear 90 drives a chain 92 which is disposed about another gear 100. The gear 100 rotates the shaft 102, which latter operates the elevator conveyor by means of a drum 106. The shaft 102 extends forwardly and has a gear 116 attached to its forwardmost end. The gear 116 is in mesh and drives an idler gear 118 which is disposed directly above the gear 116.

The idler gear 118 is in mesh with and drives another gear 130, which latter is disposed directly above the gear 118 and is secured to and rotates the shaft 132. The shaft 132 extends rearwardly to a roller 135 which in turn operates the hopper conveyor unit which may be seen disposed under the rearward end of the wagonbox in Figures 1 and 2.

From the foregoing description; it is thought to be obvious that a method of transferring power to conveyor units constructed in accordance with this invention is particularly well adapted for use, by reason of the convenience and facility with which it may be assembled and operated, and it will also be obvious that this invention is susceptible of some change and modification without departing from the principles and spirit thereof, and for this reason I do not wish to be understood as limiting myself to the precise arrangement and formation of the several parts herein shown in carrying out this invention in practice, except as claimed.

I claim:

1. In combination: a power transfer unit for use with an elevating conveyor having a frame, a generally horizontal conveyor having a frame and having one end disposed above the lower end of said elevating conveyor for delivering material thereto, a material storage unit having one end disposed above said horizontal conveyor for the convenient delivery of material to said horizontal conveyor; a power driven first shaft disposed along the outside of said material storage unit and journaled thereto, said power driven shaft terminating at a point spaced apart from the delivery end of said material storage unit; a power transfer unit frame, means pivotally attaching the lower end of said power transfer unit frame to said horizontal conveyor frame in a manner whereby the upper end of said power transfer unit frame is adapted to be pivotally swung outwardly and then downwardly away from said storage unit while pivoting about its lower end to reach a position lying substantially horizontally; a first gear at the upper end of said power transfer unit frame; a second shaft journaled to the upper end of said power transfer unit frame and mounting said first gear thereon, means detachably connecting said second shaft to said first shaft, means detachably anchoring the upper end of said power transfer unit frame to said material storage unit, a third shaft journaled to the lower end of said power transfer unit frame, a second gear mounted on said third shaft; means operably interconnecting said first and second gears, and means interconnecting said third shaft and said said conveyors for operation of said conveyors from said third shaft, the construction being such that when said power transfer unit is disposed in a generally horizontal position the said means detachably connecting said second shaft to said first shaft is usable for connecting said second shaft to another power supply source such as the power takeoff shaft of a tractor.

2. The combination described in claim 1 in which said material storage unit is a farm wagon.

3. The combination described in claim 1 in which a bracket is provided on the upper end of said power transfer unit frame projecting outwardly from a side thereof opposite to said material storage unit in a manner whereby when said frame is disposed in said approximately horizontal position said bracket will be disposed beneath and supporting the upper end of said power transfer unit frame.

4. The combination described in claim 1 in which a bracket is provided on the upper end of said power transfer unit frame projecting outwardly from a side thereof opposite to said material storage unit in a manner whereby when said frame is disposed in said approximately horizontal position said bracket will be disposed beneath and supporting the upper end of said power transfer unit frame; a platform attached to the frame of said elevating conveyor adjacent the bottom thereof for receiving said bracket thereagainst to support said power transfer unit when said unit is in said generally horizontal position.

References Cited in the file of this patent

UNITED STATES PATENTS

| | | |
|---|---|---|
| 2,097,703 | Ronning | Nov. 2, 1937 |
| 2,482,413 | Gibson | Sept. 20, 1949 |
| 2,549,247 | Scott | Apr. 17, 1951 |
| 2,563,418 | Peter et al. | Aug. 7, 1951 |
| 2,605,913 | Hon | Aug. 5, 1952 |